*US005838814A*

United States Patent [19]
Moore

[11] Patent Number: 5,838,814
[45] Date of Patent: Nov. 17, 1998

[54] SECURITY CHECK METHOD AND APPARATUS

[76] Inventor: Steven Jerome Moore, 9 Sonoma Rd., Cortlandt Manor, N.Y. 10566

[21] Appl. No.: 581,808

[22] Filed: Jan. 2, 1996

[51] Int. Cl.⁶ ....................................................... G06K 9/00
[52] U.S. Cl. ............................................. 382/115; 382/137
[58] Field of Search ................................. 382/735, 137, 382/144, 115, 145, 149; 340/825.31, 825.33, 825.34, 825.35; 235/379, 380, 381

[56] References Cited

U.S. PATENT DOCUMENTS

| | | | |
|---|---|---|---|
| 4,454,610 | 6/1984 | Sziklai | 382/119 |
| 5,160,171 | 11/1992 | Gregory et al. | 283/91 |
| 5,326,136 | 7/1994 | Doyle | 283/58 |
| 5,355,411 | 10/1994 | MacDonald | 382/119 |
| 5,504,822 | 4/1996 | Holt | 382/135 |
| 5,506,691 | 4/1996 | Bednar et al. | 382/137 |
| 5,537,486 | 7/1996 | Straitgos et al. | 382/137 |
| 5,544,255 | 8/1996 | Smithies et al. | 382/119 |
| 5,559,895 | 9/1996 | Lee et al. | 382/119 |

Primary Examiner—Joseph Mancuso

[57] ABSTRACT

A check permitting confirmation that a check was drawn by an authorized maker at the time of transaction is disclosed. Such check includes a picture of the authorized maker and an electronically-scannable means for informing the bank whether the check was transacted with the authorized maker present. The picture may include stenganographic identification coding which may be computationally-correlatable with an invisible, but photostatically-incompetent, bank mark. Confirmation of endorsement by the person or entity to whom the draft is drawn is effectuated by providing for a plurality of unique codes associated with the identity of an endorser. Such unique codes preferably include a "made payable to code" and an "endorsement code". Preferably the present invention provides for means for the drawee of the draft to confirm that sufficient funds are available in the account upon which the draft is drawn. Such means may include incorporation onto the draft itself of electronically-readable information correlatable with the account from which the draft is drawn.

7 Claims, 5 Drawing Sheets

FIG. 3

SECURITY CHECK METHOD AND APPARATUS

BACKGROUND OF THE INVENTION

1. Field of Invention

The present invention relates generally to a method, apparatus and article of manufacture for reducing transaction of unauthorized bank drafts.

2. Brief Description of Prior Art

Hundreds of thousands of checks/drafts are cleared through United States financial institutions every day. Under principles set forth in the Uniform Commercial Code, financial institutions, such as banks and credit unions, are responsible for insuring that a check was issued by the bank printed thereon (i.e., not a counterfeit), was validly signed by the person to whom the check was originally issued, and was endorsed by the party to whom the check is drawn. Payment on unauthentic, forged or improperly endorsed check results not in the debit of the account of the person to whom the check was originally issued, but rather of the account of the financial institution which honored the non-authenticate, forged or improperly endorsed check.

It has been estimated that nearly 4 billion checks are written by individuals every year for food, retail goods, etc. Significant numbers of these checks are rejected by financial institutions on the basis that the draft is a counterfeit or contains a forged signature. In such cases, the retail or service business bears the brunt of the loss. Losses to retail and service stores from bad-checks has been estimated to be over 1 billion dollars per year.

Forged and counterfeited checks significantly impact upon the consumer in terms of higher bank fees and higher retail/service prices. The consumer is also affected in less obvious ways. Because of the need to protect against fraud, sales transacted with checks are often time consuming requiring an i.d. check (usually by requesting a picture driver's license and credit card) and pre-authorization by the store manager. Many a consumer in line has cringed when the person ahead of them decides to pay for their goods with a check.

Numerous methods have been proposed to make drafts more secure against counterfeit. For example, many checks have small type in the signature line which appear as a dotted line when photocopied. Further, checks are not uncommonly printed with certain visible prints which because of the background on which they are printed on do not copy well. Counterfeit copies of such specially printed checks lack certain verbiage found on the authorized check, such as "ORIGINAL DOCUMENT."

As discussed in U.S. Pat. No. 4,463,970 to Kaule et al., early anti-counterfeiting security methods employed luminescence coding. Such coding involves marking the check, banknote etc. with fluorescent materials having a characteristic emission spectrum. The spectrum can be protected by admixing the fluorescent material with another fluorescent material (so-called "mixed fluorescence") or, as claimed in U.S. Pat. No. 4,463,970, by camouflaging the fluorescent material with the same material lacking only the luminescence property. Marking with fluorescent fibers, pellets, and particles have also been proposed, see e.g., U.S. Pat. No. 5,264,081.

Other anti-counterfeiting security systems employ authenticating layers embedded in or on the document to be protected. For example, U.S. Pat. No. 4,579,371 to Long et al. describes an electrically conductive authenticating layer which is not visually discernible and has an electrical resistivity of less than 50 megohms per square. U.S. Pat. No. 4,662,653 to Greenway describes a reflective-type diffracting grating comprising a continuous layer of reflecting material on which is deposited on a layer of dielectric material and a plurality of non-continuous reflecting layer portions embedded in the dielectric layer. Such structure permits diffraction of incident radiation into a particular pattern characteristic of the arrangement of non-continuous reflecting layer portions. In a similar vein, U.S. Pat. No. 5,161,829 to Deterick et al. describes a security paper wherein the security paper is comprised of at least two layers of paper and authentication indicia is printed on the inner surface of at least one layer. The material used to print the authentication indicia has an optical density such that in conjunction with the adhesive it is opaque enough to be detectable in transmitted light but substantially imperceptible in reflected light.

Other anti-counterfeit security marking techniques have employed invisible or substantially invisible non-luminescing print to mark documents. One of the most widely used applications of this approach is seen in the "water mark." Water marks, although generally discernable by a person, are frequently not picked up on photostatic copiers, thereby aiding in the differentiation of a copy from the original document. U.S. Pat. No. 5,160,171 describes use of a colorless or weakly-colored infra-red absorbing material which is disguised by means of an i-r transparent background or foreground. The background or foreground is described as a visually opaque i-r transparent coating (dye or pigment) with sufficient absorption in the visible region of the spectrum to render the coded i-r mark invisible to the eye. In U.S. Pat. No. 5,018,830 to Krop, there is described an authenticity mark consisting of a pattern of randomly divided granules attached to a delimited surface area of the substrate. The granules consist of retro-reflective microspheres of a specified diameter.

Numerous anti-forgery techniques have also been proposed. Many checks incorporate chemicals that cause a white mark to appear when a signature is erased from the check, as disclosed, for example, in U.S. Pat. No. 5,264,081 to Honnorat et al. Some checks are coated with special chemicals which cause stains or spots to appear upon chemical alteration of the draft. U.S. Pat. No. 5,326,136 to Doyle describes a check having imprinted thereon an authenticating signature deposited in normally non-visible material. The non-visible signature is disclosed to be made visible by wiping a solution of ferris sulphate over the authenticating signature. It is suggested in the Doyle '136 patent that the check bearer may carry such development means along with the check book in order to provide the development means to vendors and merchants who do not have access to the developing agents. The Doyle '136 patent further describes an anti-forgery system wherein the person executing the draft must encircle several alphanumeric symbols on the check to correspond to an identification code known by the recipient of the check, such as the bank.

Numerous signature analysis techniques have also been proposed to combat forgery. For example, many banks employ signature cards to compare the signature on a check with one or more exemplars of a valid signature maintained at the bank. Computer-assisted comparison systems providing a plurality of stored reference signatures on a screen against which the signature on a draft may be compared are also available. Automated signature verification methods can be broadly classified into two types: those systems involving verification of a signature at point-of-purchase, or "dynamic" verification and those involving verification of a previously executed draft, or "static" verification. An example of a dynamic verification system is set forth in U.S. Pat. No. 5,434,928. Dynamic verification systems require use of a special pen device for converting the dynamic variations inherent in writing into electrical signals for analysis against a previously stored signature pattern made in the same manner. U.S. Pat. Nos. 4,985,928, 5,257,320, 5,251,265 and 5,251,269 describe static systems for comparing signatures against exemplar signatures stored in a central database. Static systems permit comparison against signatures existing on a check without need for special pens. Both dynamic and static signature comparison techniques have been met with limited success.

A problem attendant with both dynamic and static systems is the need for storing large number of exemplar signatures in a central database for comparison with a latter issued check. In order to overcome this problem, U.S. Pat. No. 5,257,320 describes an encoding apparatus for producing a digital representation of at least a portion of a person's signature and imprinting such digital representation onto a check for subsequent comparison to the executed signature. As described, a typical check would have a signature box defined within which the signature is required to be written preceded by one or more codes, such as a block of numbers. The block of numbers would be representative of the reference measures determined previously.

Prior art attempts to protect against counterfeit and forgery suffer from several drawbacks.

Many anti-counterfeiting techniques, such as employment of special authenticating layers in the checks, are relatively expensive to implement. Techniques which mark drafts with luminescing print, substantially invisible non-luminescing print, small print, or visible prints that do not copy well, while frequently entailing less expense, generally fail to provide a mechanism to dissuade applying similar prints onto unauthorized copies.

Presently available anti-forgery techniques are also deficient in a number of regards. Schemes that detect alteration of a signature, for example causing a white mark to appear when the issuer's signature is erased or causing spots to appear if the signature is chemical altered, do nothing to prevent a person from fraudulently signing a check in the first place. Schemes that require the person signing the check to mark the document with a personal identification number ("pin") before transacting the same do little to protect the retailer who does not have access to the identification number and permits those accepting the check to easily learn the pin of the person proffering the check. Checks imprinted with invisible authenticate signatures, do little to prevent fraud when signature comparison is by manual means and development is by chemical means. Imprinted marks correlating to parameters of a valid signature, while aiding banks in determining forgeries, suffer from the ease with which forgers may alter the same.

Anti-forgery and anti-counterfeiting techniques of the prior art further failure to provide an adequate method for detecting forged signatures of endorsing parties. Such techniques further fail to provide a means for a person accepting the check to determine whether the account from which the check is drawn has sufficient funds.

SUMMARY OF THE INVENTION

The disadvantages of prior art anti-counterfeiting and anti-forgery techniques with respect to checks and other drafts are overcome in accordance with the present invention by providing means for identifying the authorized maker of a draft, for verifying issuance of the draft by the bank named on the draft, for identifying the authenticating signature of the authorized maker of a draft, for confirming endorsement by the person or entity to whom the draft is drawn, and for validating that sufficient funds are present in the account upon which the draft is drawn at the time of transaction.

The present invention allows for identification of the authorized maker of a draft by including on the draft a picture of the authorized maker of the check. Electronically-scannable means are provided for informing the bank whether the check was transacted with authorized maker present. Such means may include one geometric figure housed within another geometric figure such that marking of the one figure represents that the maker was present at the transaction, and marking into the other geometric figure represents that the authorized marker was not present at the transaction. Filling in of the areas bounded by the figures is correlated with a yes/no response in such a manner that a positive response may be converted into a negative response simply by filling in the unmarked bounded area on a check that was originally marked as "yes."

Verification that the bank named on the draft issued the same, and that the draft is not a photostatic copy, is effectuated by means of incorporating onto the check an invisible, or nearly invisible, or encrypted, electronically-readable, but photostatically-incompetent, bank mark. The mark may be printed with inks that do not substantially absorb light in the visible range but absorb light in other ranges such as the infrared or near infrared range. Such inks may comprise micronized rare earth metals such as neodymium, ytterbium and erbium, which when placed on a white background are substantially invisible, but when exposed to infrared light may be detected by electronic means. Other suitable inks are described in U.S. Pat. No. 5,093,147, such inks being invisible to the naked eye but being capable of being activated in the infrared and fluorescing at longer wavelengths in the infrared (e.g., DTTCI, DNTTCI, HDITCI, IR-125, DDTTCI, IR-140, DDCI-4 and IR-132). Preferably, such bank mark includes a key, such as a code number, relating the check specifically to the bank. More preferably, the bank mark key is capable of being computationally-related to a second mark incorporated in another position on the draft. Again such second mark is preferably invisible, or nearly invisible, or encrypted, electronically-readable, but photostatically-incompetent.

A technology which has been recently introduced to embed signatures into digital representations of photographs, images and audio referred to as "Digital Steganography" may be employed in the present invention. Steganography typically involves encryption of a identifying code, by means of an encryption system such as Data Encryption Standard (DES) or the Rivest-Shamir-Adelman (RSA) public-key system, and hiding the message in innocuous form for subsequent identification. An example of such a system is the proprietary Digimarc Signature System which signs property with a random code pattern produced by generating a random number for each pixel of the image. The Digimarc system stores a small identification mark in every pixel with random amplitude, so it does not have a predictable bit location. Since photostatic copying of the picture, or insertion of another picture in place of the picture of the authorized maker, will fail to provide the identification mark, an original check can easily be distinguished from a copy, especially when the check includes a bank mark key computationally-correlatable to the stenganographic identification mark on another portion of the draft.

Another relatively new technology permits economic short run digital printing and is referred to as "Digital Offset Printing." Such technology combines high performance digital imaging technology with liquid ink offset printing and permits different images to be printed on each sequential page. Digital offset printing permits small orders of documents, such as checks, to be printed without the need for film separations, printing plates, complex ink balance and manual registration adjustments often associated with standard non-digital off-set procedures. Such system permits checks to be printed for identification purposes with an exemplar of the authenticate signature of the authorized maker of the draft. In order to inhibit defacement of the authorized signature, the signature is preferably printed in an invisible or substantially invisible print, or encrypted onto the check in a manner to be invisible or substantially invisible to the naked eye. More preferably, select parameters pertaining to features of the signature that are unique to the authorized maker are encoded in invisible, or substantially invisible form. Data related to parameters of a valid signature may be incorporated into a visible or invisible means, such as a plastic thread, embedded within the draft. As described in Doyle 5,326,136, a plurality of alphanumeric symbols may be included on the draft, the correct marking of which would be known only to the authorized maker and the financial institution(s) transacting the draft. An improvement of such technique would provide for marking by means of incorporating pressure-sensitive capsules containing invisible prints in the area surrounding such alphanumerals. Preferably the print released from such capsules would be visible only at select wavelengths of light and would be machine-readable.

A further aspect of the present invention is directed to a method for differentiating between an original and counterfeit draft comprising the steps of: (i) determining an algorithm correlating a first identification code with a second identification code; (ii) applying to said original draft said first identification code such that said first identification code is substantially invisible to the human eye; (iii) applying to said original draft said second identification code; (iv) determining whether a tendered draft has said first and second identification codes applied thereon by development means; (v) rejecting as counterfeit said tendered drafts lacking either of said first or second identification codes; (vi) using said algorithm, comparing said first and second identification codes on said tendered drafts wherein said first and said second identification codes are discerned; (vii) rejecting as counterfeit said tendered drafts lacking correlation between said first and said second identification codes. The development means may employ a scanner comprising a plurality of scanning heads wherein each head selectively reads certain data substantially unread by the other head and data from each head is fed into a single data processing means.

And yet a further aspect of the invention is directed to a security draft for protection against forgery wherein a digital picture of the authorized maker is incorporated thereon and a first identification code is within the picture of the draft, such first identification code being correlatable to the authorized maker of the draft.

Confirmation of endorsement by the person or entity to whom the draft is drawn is effectuated by providing for a plurality of unique codes associated with the identity of an endorser. Such unique codes preferably include a "made payable to code" and an "endorsement code". The "made payable to code," provided by a bank or other financial institution, is provided by the endorser to the maker of the draft when the draft is drawn. The "endorsement code" is known to the endorser and is placed upon the draft when the draft is endorsed. Preferably, the "endorsement code" is protected against visible discernment by third parties or by subsequent endorsers. Provision for such security may include use of pressure sensitive paper portions containing encapsulated invisibile, or substantially invisible, prints. Confirmation of execution by the authorized endorsement is made possible by making the "endorsement code" computationally-correlatable to the "made payable to code". The draft may also provide for a means of notifying the financial institution that any subsequent endorsement is invalid, as for example, including a box which may be marked if the draft is to be "deposited only."

Preferably the present invention provides for means for the drawee of the draft to confirm that sufficient funds are available in the account upon which the draft is drawn. Such means may include incorporation onto the draft itself of electronically-readable information correlatable with the account from which the draft is drawn. Means may also include a separate "authorization card" upon which similar information is incorporated. Such card is preferably scanned electronically and the person scanning the card permitted to input a value correlating to the amount written upon the draft. The information pertaining to the account and amount of the draft are sent to a database which correlates the total amount in the account with the account identifier. If sufficient funds are presently available a signal may be sent to confirm the same. Such confirmation means may further entailing debiting or segregating from the account from which the draft is drawn an amount correlatable to the amount entered by the person scanning the card. Such amount may be automatically be re-credited to the account if the draft is not presented for payment to the issuing financial institution within a set period of time.

DETAILED DESCRIPTION OF THE
ILLUSTRATIVE EMBODIMENT OF THE
PRESENT INVENTION

Figure 1A:
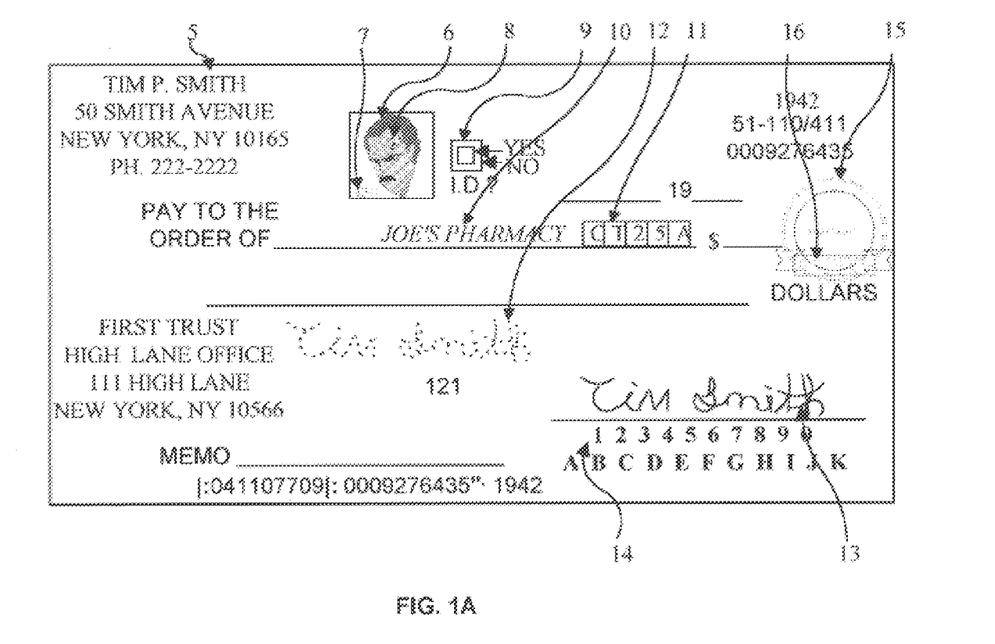
FIG. 1 is a perspective view illustration of the front of a check of the present invention.
Figure 1B:
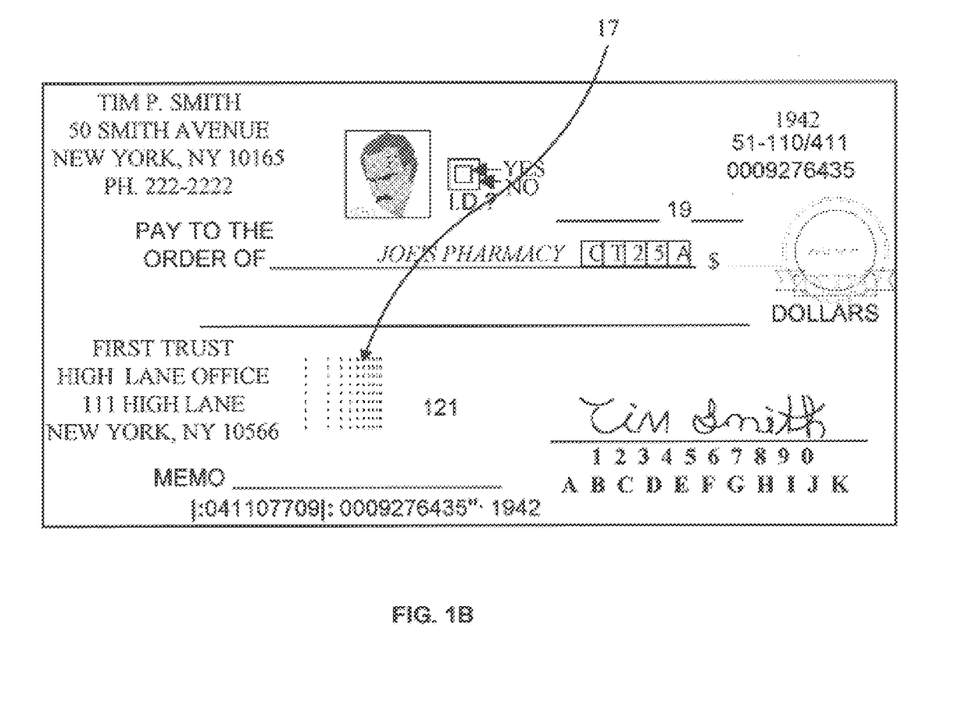
Figure 1C:
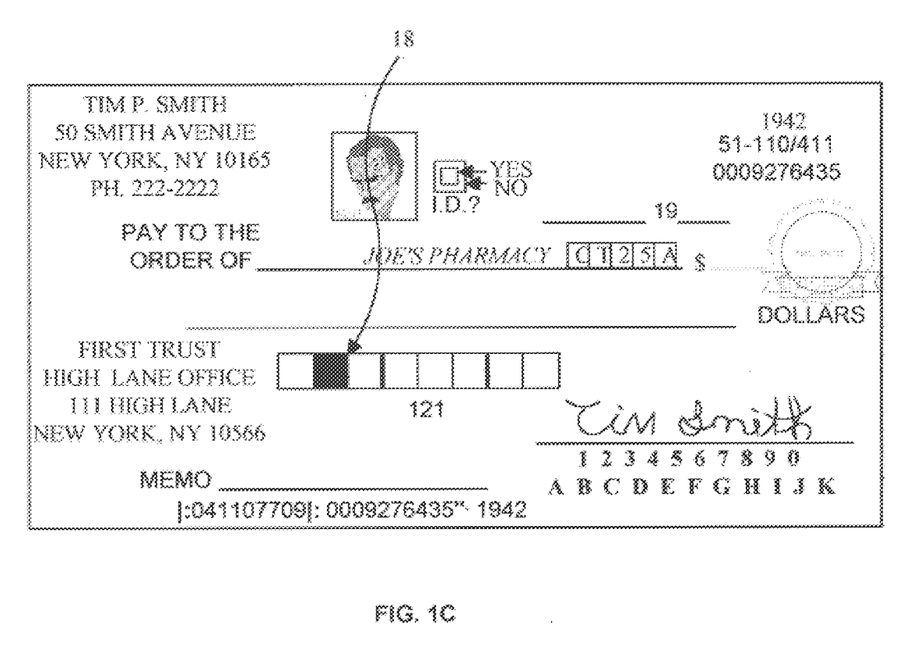

Referring to FIG. 1 of the drawings, there is shown a perspective view of a front of a check 5 of an embodiment of the present invention. Check 5 includes a picture 6 of the authorized maker of the check, as shown "Tim P. Smith." Picture 5 preferably includes distinct invisible or encrypted data 7, 8 within the confines of the picture. Picture 5 is further digitally-derived and may by means of digital steganography incorporate a data correlating to an actual hand-written signature 13 of a person or may incorporate a digital identification signature therein. In tandem with picture 5, there is provided a means 9 for identifying to a transacting financial institution whether actual identification of the maker was made at the time of transaction. Means 9, which as shown is comprised of one geometric figure surrounded by another geometric figure, permits a person accepting a check to change a positive response as to whether identification of the maker was made at time of transaction to a negative response simply by marking into the area surrounding the positive response and delineated as a negative response. Check 5 further comprises an invisible, or substantially invisible, bank mark 15 which is detectable by electronic means. Preferably bank mark 15 incorporates therein a maker identification code 16 which preferably is correlatable to distinct invisible or encrypted data 7, 8 or digital steganographic coding incorporated into picture 6. Counterfeit check can be determined by scanning check 5 and comparing by means of a pre-determined validating algorithm the maker identification code 16 with the distinct invisible or encrypted data 7, 8 or the digital steganographic coding incorporated in picture 6, counterfeits consisting of documents in which there is no correlation existing. Additionally, check 5 may include a invisible, machine-readable, authorized signature template 12 or coded representation of unique parameters thereof, such representation which may take the form of an invisibly imprinted bar code 17 or an embedded polymeric string with bar coded information incorporated therein 18. Check 5 further provides for incorporation of a "made payable to code" 11 in the "pay to the order of" portion of check following the spot where the drawee's identification is made 10 by providing a delineating area for such code. Such code is preferably provided by a central clearing house for financial institutions and is unique to a business or bank customer. "Made payable to code" 11 is preferably correlatable using a pre-determined central clearing house algorithm to an "endorsement code" provided to a business or bank customer and which is preferably entered on the backside of check 5 when the business or bank customer endorses the check. Check 5 may further comprise a plurality of alpha-numeric symbols 14, the correct marking of which would be known only to the authorized maker and the financial institutions transacting the draft. Preferably such alpha-numeric symbols incorporate pressure-sensitive capsules containing invisible, machine-readable, prints such that a maker of the draft may encode the draft without the chosen numbers being visible to on-lookers.

Figure 2:
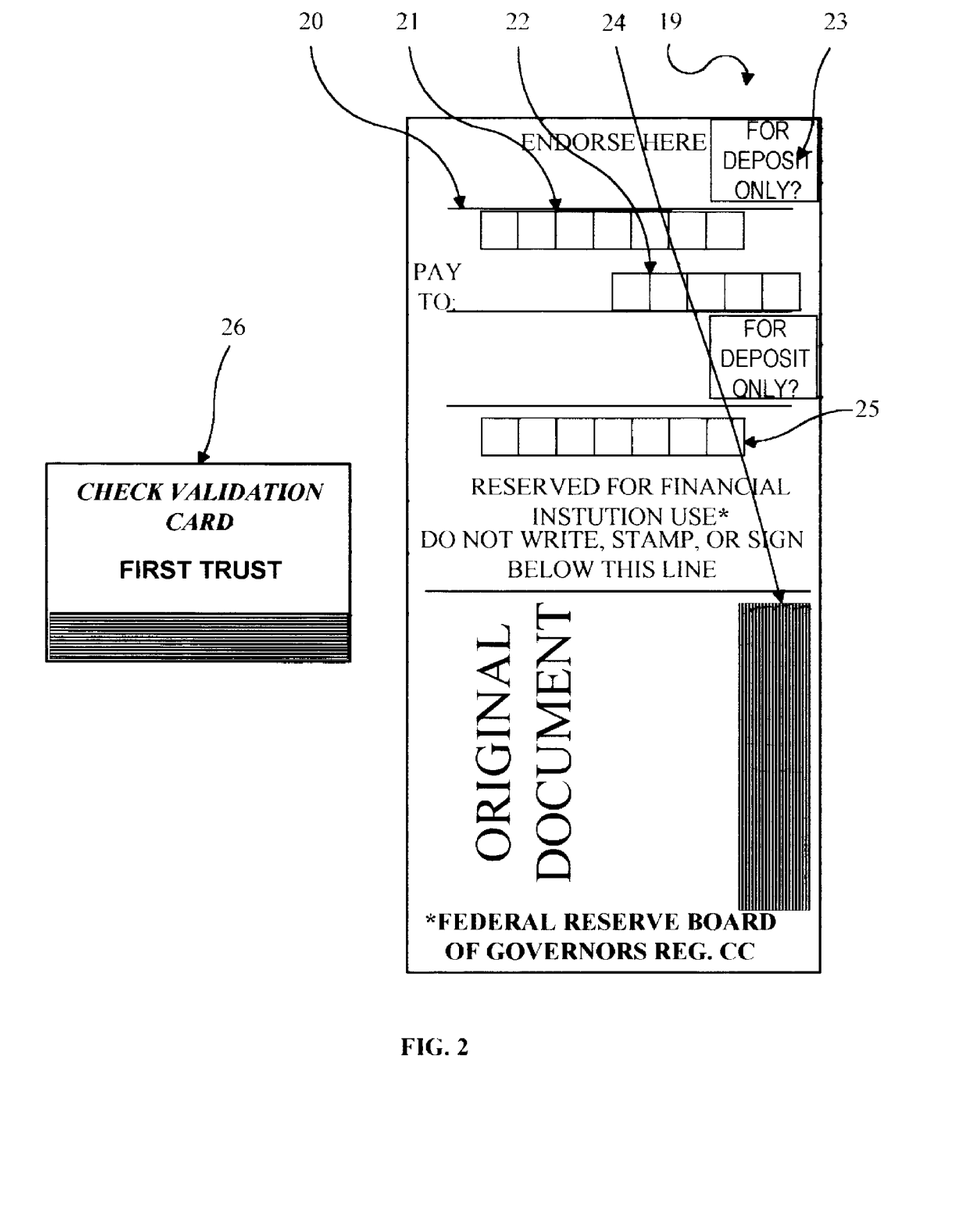
FIG. 2 is a perspective view illustration of the backside of a check of the present invention and a check validation card.

Now referring to FIG. 2, there is shown is a perspective view illustration of the backside 19 of check 5 and a check validation card 26. Backside of check 5 has an endorsement line 20 for endorsing check 5 with a signature. Backside of check 5 may further have geometric FIG. 23 which may be marked to indicate that the check is to be "Deposited Only" and that further endorsements are invalid. Backside of check 5 preferably has a delineated area 21 for entering an "endorsement code" used in conjunction with "made payable to code" 11 on the front-side of check 5 to confirm that endorsement is by the person or entity to whom the check is drawn. Subsequent endorsements to third parties may be made on the backside of check 5 and may include delineated area 22 for entering a "made payable to code" and a delineated area 25 for a subsequent "endorsement code." A portion of check 5 may be encoded to uniquely identify the account upon which it is drawn 24. Such portion may be electronically read at a point of purchase and data relating to the same and the amount for which the check is written sent to a central financial processing unit which correlates the account balance to the account number. The central processing unit may send a confirmatory signal back to the point of sale to confirm that the account has sufficient funds to provide payment on the check, using technology well known in the art with respect to credit cards. The central processing unit may be programmed to segregate the amount entered at the point of sale from the remaining balance for a period of time to permit clearance of the check within that time frame and such that further requests relating to the balance in the account does not take into account the funds earmarked by a previously written check. Instead of the account information being imprinted or incorporated onto check 5 itself, such account information may be housed on a standard data retention substrate, such as a card 26.

Figure 3:
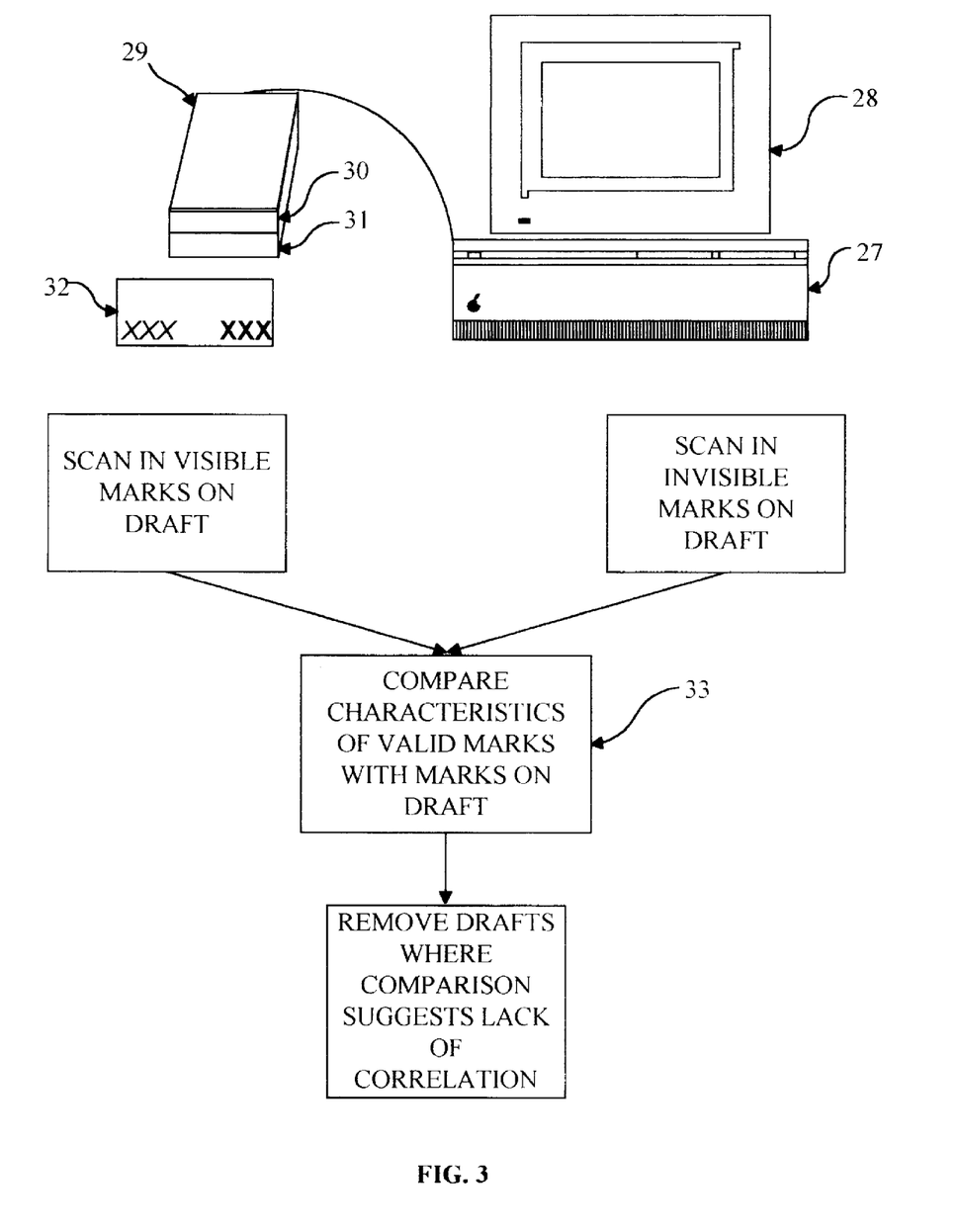
FIG. 3 is a schematic representation of a device and method finding employment in the present invention.

Now referring to FIG. 3, there is shown a schematic representation of a device and method finding employment in the present invention. Electronic reading means at central clearing house preferably provides for a use of a scanner capable of reading both visible data and the data printed with invisible or substantially invisible print. As shown in FIG. 3, a dual-headed scanner 29 with a head set to read one wavelength 30 of reflected light 31 and a head set to read another wavelength of reflected light is shown. Preferably, the check includes data imprinted on substrate 32 in such a manner each head selectively reads certain data substantially unread by other head. Data from each head is fed into data processing means 27 which may be connected to numerous peripherals, such as monitor 28. As exemplified at 33, the process employed for verification of authenticity at central clearing house involves comparison of the characteristics of the visible and invisible marks with each other and with information relating to valid marks stored in data processing means 27. When comparison is not validated, the draft is removed from processing before payment.

What is claimed is:

1. A security method for authenticating the validity of a draft comprising:

(i) providing the authorized maker of a draft requiring a signature for transaction of said draft with an electronically-readable means for identifying the account from which said draft is to be drawn;

(ii) obtaining said electronically-readable means from a person transacting a signed draft;

(iii) electronically reading said electronically-readable identification means and converting the same into an electronic data stream;

(iv) electronically inputting the amount for which said signed draft is drawn and coupling such with said electronic data stream relating to said identification;

(v) exporting said coupled data to a data processing means having access to account information concerning fund availability in said account at the time of transaction of the draft;

(vi) providing the inputter of said signed draft amount with confirmation that said account has sufficient funds to cover said draft;

(vii) segregating said inputted amount from other funds in the account and debiting the same upon receipt of said signed draft if said draft is determined to have been signed by said authorized maker.

2. The method of claim 1 further comprising the step of incorporating said electronically-readable means onto said draft.

3. The method of claim 1 further comprising the step of incorporating said electronically-readable means onto a substrate separate form said draft.

4. The method of claim 1 further comprising the step of providing the authorized maker of draft with an electronically-readable means for identifying the authorized maker of said draft.

5. A security draft with incorporated means for authenticating the validity of the signed draft, comprising:

(i) a substrate having a face portion and a back portion, said face portion having imprinted thereon a maker signature delineation area, and said back portion having imprinted thereon an endorser signature delineation area;

(ii) a digital picture of the authorized maker imprinted on said face portion or said back portion of said substrate, said digital picture having encoded therein data with respect to the characteristics of the verified signature of the authorized maker;

(iii) an identification code correlatable with encoded data within said digital picture printed on said face portion or said back portion of said substrate at a position outside of said digital picture.

6. The security draft of claim 5 wherein said identification code is printed in a concealed manner.

7. The security draft of claim 6 wherein said concealed identification code is printed in an ink undetectable in the visible spectrum.

* * * * *